United States Patent
Lin

(10) Patent No.: US 12,192,147 B2
(45) Date of Patent: Jan. 7, 2025

(54) METHOD OF UPLINK ACKNOWLEDGMENT FOR DOWNLINK DATA RECEIVED ON AN UNLICENSED BAND IN A RADIO ACCESS NETWORK

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 518 days.

(21) Appl. No.: 17/704,928

(22) Filed: Mar. 25, 2022

(65) Prior Publication Data
US 2022/0278810 A1    Sep. 1, 2022

Related U.S. Application Data

(63) Continuation of application No. PCT/IB2019/001109, filed on Sep. 25, 2019.

(51) Int. Cl.
*H04L 5/00* (2006.01)
*H04L 1/1809* (2023.01)
*H04L 1/1812* (2023.01)
*H04W 72/21* (2023.01)

(52) U.S. Cl.
CPC .......... *H04L 5/0055* (2013.01); *H04L 1/1809* (2013.01); *H04L 1/1812* (2013.01); *H04W 72/21* (2023.01)

(58) Field of Classification Search
CPC ... H04L 5/0055; H04L 1/1809; H04L 1/1812; H04L 1/1864; H04L 1/1848; H04W 72/21
See application file for complete search history.

(56) References Cited

U.S. PATENT DOCUMENTS

2019/0297618 A1*  9/2019  Yang ................... H04L 5/0094
2021/0282182 A1*  9/2021  Nogami ................ H04W 74/08

OTHER PUBLICATIONS

International Search Report (ISR) dated Jun. 29, 2020 for Application No. PCT/IB2019/001109.
Nokia et al: "HARQ scheduling and feedback for NR-U", 3GPP Draft, R1-1904183_HARQ, 3rd Generation Partnership Project (3GPP), Mobile Competence Centre; 650, Route Des Lucioles; F-06921 Sophia-Antipolis Cedex; France, vol. RAN WG1, No. Xi'an, China: Apr. 8, 2019-Apr. 12, 2019 Apr. 7, 2019(Apr. 7, 2019), XP051699518.

(Continued)

*Primary Examiner* — Dinh Nguyen
(74) *Attorney, Agent, or Firm* — Ladas & Parry LLP

(57) ABSTRACT

Upon receiving a first DCI that does not contain explicit indication about a group identifier and/or a new feedback indicator, the UE determines whether group-based acknowledgement feedback is active. If so, the allocates the first DCI to a default group. The UE determines whether to toggle a new feedback indicator value for the default group based on a comparison of field values in the first DCI and those in the default group. The UE then transmits on an uplink channel acknowledgement feedback of the first group to the base station for the downlink data according on the new feedback indicator.

15 Claims, 6 Drawing Sheets

(56) References Cited

OTHER PUBLICATIONS

Mediatek Inc: "Enhancements fo HARQ for NR-U operation", 3GPP Draft; R1-1908387_Enhancements to HARQ for NR-U Operation_MTK_Final, 3rd Generation Partnership Project (3GPP), Mobile Competence Centre; 650, Route Des Lucioles; F-06921 Sophia-Antipolis Cedex; vol. RAN WG1, No. Prague, Czech: Aug. 26, 2019-Aug. 30, 2019 Aug. 17, 2019(Aug. 17, 2019), XP051764996.
Samsung: "HARQ enhancements for NR-U", 3GPP Draft; R1-1908467, 3rd Generation Partnership Project (3GPP), Mobile Competence Centre: 650, Route Des Lucioles. F-06921 Sophia-Antipolis Cedex; France, vol. RAN WG1, No. Prague, CZ; Aug. 26, 2019-Aug. 30, 2019 Aug. 16, 2019(Aug. 16, 2019), XP051765076.
Ericsson. 3GPP TSG-RAN WG1 Meeting #98 R1-1909300; HARQ and scheduling enhancements for NR-U, Prague, Aug. 26-30, 2019.
The first Office Action of corresponding European application No. 19817808.9, dated Dec. 6, 2022.

\* cited by examiner

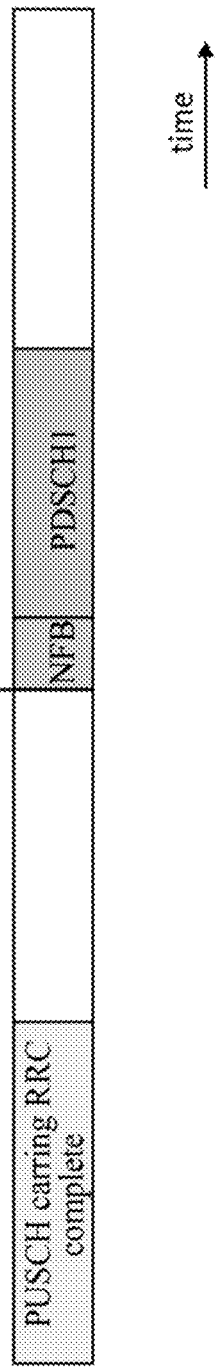
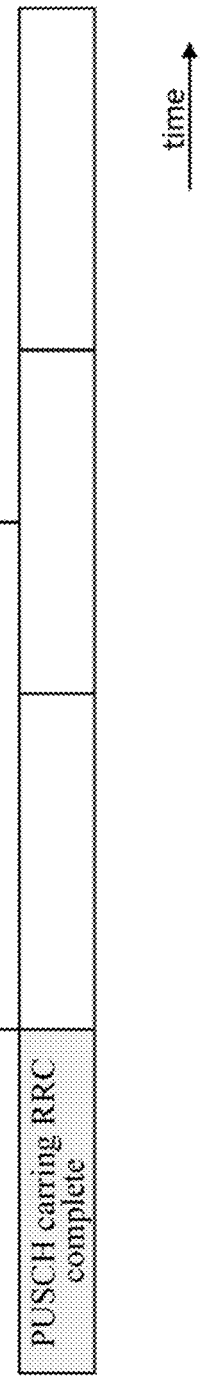
FIG. 1A
FIG. 1B

METHOD OF UPLINK ACKNOWLEDGMENT FOR DOWNLINK DATA RECEIVED ON AN UNLICENSED BAND IN A RADIO ACCESS NETWORK

CROSS-REFERENCE TO RELATED APPLICATIONS

This application is a continuation of International Application No. PCT/IB2019/001109, filed on Sep. 25, 2019, which is hereby incorporated by reference in its entirety.

TECHNICAL FIELD

The present disclosure relates to the field of telecommunications, and in particular to a method of acknowledgment on an uplink channel, from a user equipment to a base station, for downlink data received on a downlink channel of an unlicensed band in a radio access network, and to user equipment employing such methods.

BACKGROUND

A radio access network is part of a telecommunications system. The 3rd Generation Partnership Project (3GPP) defines a fifth generation (5G) network, which uses New Radio (5G NR) as the radio access technology (RAT).

In 5G NR RAT as defined by 3GPP standards, downlink and uplink transmissions are scheduled by the base station. Here, downlink means data transmitted from a base station (BS) to a user equipment (UE) and uplink means data transmitted from a user equipment to a base station. Downlink data may be transmitted over a channel such as a physical downlink shared channel (PDSCH). Prior to transmitting the downlink data, a base station transmits downlink control information (DCI) relating to the downlink data transmission. The DCI may be transmitted over a channel such as a physical downlink control channel (PDCCH).

Downlink data transmissions may be dynamically scheduled by the base station. DCI is transmitted by the base station for each dynamically scheduled downlink data transmission. This DCI indicates the resources in time and frequency for the transmission of the downlink data to enable the UE to identify and receive the downlink data. The DCI also indicates a slot for a corresponding acknowledgment transmission from the UE. Thus for each DCI there is a corresponding acknowledgement from the UE. If the base station does not receive an acknowledgement it presumes the UE did not correctly receive the downlink data and schedules a retransmission of the downlink data.

To increase the spectrum available to the telecommunications system, a 5G radio access network may also utilise unlicensed spectrum, referred to as a new radio-unlicensed (5G NR-U) radio access network. Unlicensed spectrum is a shared spectrum that may be used by other telecommunications networks. In order to allow various communication systems or devices to use the unlicensed spectrum and coexist in a friendly manner, regulatory requirements have been specified which must be met by any communication systems using the unlicensed spectrum. For example, one such regulatory requirement is that a communication device (for instance a user equipment) must follow a "Listen Before Talk (LBT)" procedure. Listen Before Talk means that the communication device must listen to sense whether the channel is already in use before transmitting any signal on the channel. The communication device may transmit on the channel only when the channel sensing shows that the channel is not in use. The communication device may not transmit on the channel if the channel sensing shows the channel is in use.

It is desirable to make the most efficient use of the unlicensed spectrum. For this reason, in 5G NR-U, dynamically scheduled downlink data transmissions are usually grouped. The grouping is used to allow the base station to trigger an ackowledgement feedback transmission from the user equipment for a group rather than for a single downlink data transmission.

To support grouping, non-fallback downlink control information (NFB-DCI) is transmitted by the base station. NFB-DCI includes information elements includes the following information fields, defined in 3GPP standards:
Group ID
HARQ ID
NDI
C-DAI, T-DAI
Trigger bit
K1
NFI The field 'Group ID' or 'Group' indicates a group identifier identifying the group to which the associated downlink data transmission belongs. The field 'HARQ ID' indicates a HARQ process identifier for the downlink data transmission associated with the NFB-DCI. The field 'NM', or new data indicator, indicates if the associated downlink data transmission is a new transmission or a retransmission. The field 'T-DAI' represents a total number of downlink data transmissions in the group, as scheduled by the base station at the time of the current DCI. The field 'C-DAI' represents a sequence number of the associated downlink data transmission in the total number of downlink data transmissions scheduled, T-DAI. The field 'Trigger bit' or 'Trigger' indicates whether the user equipment must perform an acknowledgment feedback transmission only for the current group (Trigger bit=0) or for the current group and all other groups (Trigger bit=1). The field 'K1' indicates that a slot number the user equipment should use for acknowledgement transmission on uplink. K1 is expressed as a number of slots after the slot used for the downlink data transmission. 'NFI', or new feedback indicator, indicates whether the previous acknowledgement transmission for the same group ID was received by the base station or not. More precisely, NF1 is a bit which value is changed from '0' to '1' or from '1' to '0' by the base station when an acknowledgment transmission for the same group ID is received. The process of changing a bit value from '0' to '1' or from '1' to '0' is also called toggling.

In addition to NFB-DCI, a base station may also transmit fallback downlink control information (FB-DCI). FB-DCI may be used in situations where the quality of the radio link with a UE is not good, or where RRC configuration is not effective. FB-DCI omits some of the fields present in NFB-DCI, including NFI, Group ID, and T-DAI.

When unlicensed spectrum is being used by a 5G network, there is no guarantee that NFB-DCI transmitted by the base station will be received by the UE. In some cases, the UE may receive a FB-DCI transmission from the BS. However, FB-DCI transmissions do not include fields required to support grouping. If the UE sends acknowledgement for only the FB-DCI, the base station does not know whether previous transmissions in the group were received by the UE. This may lead to unnecessary re-transmissions by the base station, which is undesirable.

The present disclosure aims to define how the user equipment should handle such a situation.

SUMMARY

A first aspect of the present disclosure resides in a method of acknowledgment on an uplink channel, from a user equipment to a base station, for downlink data received on a downlink channel of an unlicensed band in a radio access network, comprising:
- receiving, by the user equipment, a first downlink control information element that does not contain explicit indication about a group identifier and/or does not contain explicit indication about a new feedback indicator;
- determining, by the user equipment, whether group-based acknowledgement feedback is active, wherein if group-based acknowledgement feedback is determined to be active:
- allocating, by the user equipment, the first downlink control information element to a first group;
- determining, by the user equipment, a slot in which the user equipment shall report acknowledgement feedback of the first group based on an information field (K1) of the first downlink control information element;
- determining, by the user equipment, an accumulated number of transmissions in the first group based on the value of a second information field in the first downlink control information element;
- determining, by the user equipment, an updated new feedback indicator for the first group based on an existing new feedback indicator for the first group and a first condition, wherein:
- if the first condition is determined to be satisfied, the updated new feedback indicator for the first group is determined by toggling the existing new feedback indicator;
- if the first condition is determined to be not satisfied, the updated new feedback indicator for the first group is determined to be the existing new feedback indicator; and
- transmitting on an uplink channel, by the user equipment, acknowledgement feedback of the first group to the base station based on the new feedback indicator.

A second aspect of the present disclosure resides in a user equipment comprising a module for acknowledgment on an uplink channel, from the user equipment to a base station, for downlink data received on a downlink channel of an unlicensed band in a radio access network, configured to control the execution of the steps defined in the first aspect.

A third aspect of the present disclosure resides in a computer readable medium comprising program instructions for causing a user equipment to perform the steps of a method according to the first aspect.

BRIEF DESCRIPTION OF DRAWINGS

Other features, purposes and advantages of the present disclosure will become more explicit by means of reading the detailed statement of the non-restrictive embodiments made with reference to the accompanying drawings.

FIGS. 1A to 1B and FIGS. 2 to 6 show exemplary embodiments of acknowledgment transmissions for downlink data receptions according to embodiments of the present disclosure.

DESCRIPTION OF EMBODIMENTS

Figure 2:
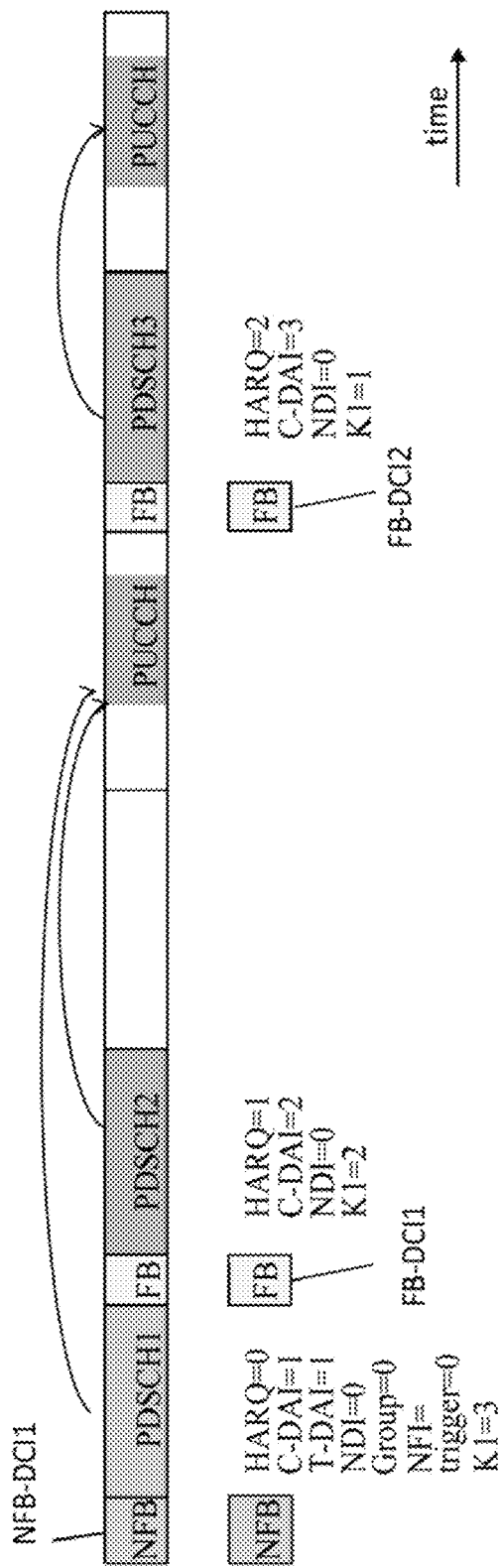

Embodiments of the present disclosure relate to a method of acknowledgment on an uplink channel, from a user equipment (UE) to a base station (BS), for downlink data received on a downlink channel of an unlicensed band in a radio access network, and to user equipment employing the method. For example, in some embodiments the mobile telecommunication system may be a 5G mobile network and the radio access network may be an unlicensed spectrum compliant with 5G NR-U (New Radio in unlicensed spectrum) as defined by 3GPP standards.

The method comprises receiving, by the UE, a first downlink control information element that does not contain explicit indication about a group identifier and/or does not contain explicit indication about a new feedback indicator. The first downlink control information element may be a fallback downlink control information (FB-DCI) element in some embodiments.

Upon receipt of the first downlink control information element, the UE determines whether group-based acknowledgement feedback is active, as described in more detail below.

If the UE determines that group-based acknowledgement feedback is active, the UE then allocates the first downlink control information element to the group ID included in the first downlink control information element or to a first group if no group ID is included in the first downlink control information element. The first group may be either a predetermined value stored in the UE or a default value received from the base station, for instance via radio resource control (RRC) configuration. In some embodiments, the first group is the predetermined value stored in the UE unless a default value is received from the base station, in which case the latter is used.

Next, the UE determines a slot in which to report acknowledgement feedback of the first group based on a first information field of the first downlink control information element. This first information field may be the K1 information field in a FB-DCI element. Having allocated the first downlink control information element to the first group, the UE then interprets the first downlink control information element as triggering acknowledgement feedback reporting for the first group, thus ensuring that acknowledgement for the group is transmitted to the base station, reducing the likelihood of unnecessary retransmissions.

The UE then determines an accumulated number of transmissions in the first group as the value of a second information field in the first downlink control information element. This second information field may be the C-DAI field in a FB-DCI element. Since the first downlink control information element, this determination ensures the UE includes the first downlink control information element in the sequence of transmissions in the first group and prevents the UE from getting out of sync with the base station, for instance in the case where a FB-DCI was transmitted by the base station because a NFB-DCI transmission that was part of the first group was not received by the UE.

Next, the UE determines an updated new feedback indicator (NFI) for the first group. The new feedback indicator is used to determine the HARQ processes in the first group for which acknowledgement feedback should be transmitted. If the first downlink control information element includes a new feedback indicator, the UE uses this value as the updated new feedback indicator for the first group. Otherwise, the UE determines the updated new feedback indicator based on an existing new feedback indicator for the first group stored in the UE and a first condition.

If the first condition is determined to be satisfied, the UE determines the updated new feedback indicator for the first group by toggling the existing new feedback indicator for the first group. If the first condition is determined to be not satisfied, the UE determines the updated new feedback indicator for the first group to be the existing new feedback indicator.

In some embodiments, the first condition comprises whether a HARQ process ID indicated in the first downlink control information element is equal to a first HARQ process ID value.

In other embodiments, the first condition comprises whether a HARQ process ID indicated in the first downlink control information element is equal to a first HARQ process ID value and whether the C-DAI field in the first downlink control information element has a first DAI value. For instance, the first DAI value may be a predetermined value, a value set be RRC configuration or a value determined by the UE for the first group.

In still other embodiments, the first condition comprises whether a HARQ process ID indicated in the first downlink control information element is equal to a first HARQ process ID value, and whether the C-DAI field in the first downlink control information element has a first DAI value, and whether a new data indicator (NDI) field in the first downlink control information element is toggled with respect to a NDI value for the said first HARQ process ID stored in the UE.

In some embodiments, the first HARQ process ID value may be one of the HARQ process IDs in the first group before UE receives the first downlink control information element.

In other embodiments, the first HARQ process ID value may be one of the HARQ process ID, scheduled by the same DCI format as the first downlink control information element, in the said first group before UE receives the first downlink control information element.

These embodiments provide varying specificity with regards to the conditions under which the UE will determine a previous acknowledgement feedback transmission for the first group was received by the base station. That is, the conditions under which the UE will infer a toggled NFI.

In some situations, the first downlink control information element may be the first DI received by the UE after the group-based function becomes active, in which case there may not be a first group established. In that case, the UE establishes the first group and includes the first downlink control information element in the first group. However, in this situation, there will not be an existing new feedback indicator for the first group. In this case, the UE determines an initial value for the existing new feedback indicator according to either a predetermined value stored in the UE or a default value received via RRC configuration. In some embodiments, if the UE then receives a second DCI containing a group ID that is the same as the first group ID prior to the UE transmitting acknowledgement feedback, the initial new feedback indicator value of the first group is replaced with the value of the NFI field in the second DCI.

Having determined an updated value for the new feedback indicator, the UE then transmits on an uplink channel acknowledgement feedback of the first group to the base station based on the new feedback indicator.

As mentioned above, the UE determines whether group-based acknowledgement feedback is active. The UE determines whether group-based acknowledgement feedback is active by evaluating a second condition, wherein if said second condition is satisfied, the UE determines that the group-based acknowledgement function is active.

In some embodiments, the second condition comprises at least one of: reception of a second downlink control information element after a first reference time; and/or expiry of a first timer prior to receiving the first downlink control information element. In some embodiments, the reception of the second downlink control information element must occur prior to receiving the first downlink control information element.

In some embodiments, second condition comprises whichever of the first timer expiry and reception of the second downlink control information element occurs first.

In some embodiments, the first reference time can be either the time when the UE finishes transmitting a RRC configuration/reconfiguration complete message, or the time when UE receives an uplink grant to transmit said RRC configuration/reconfiguration complete message.

In some embodiment, the UE is configured to start the first timer after transmitting a RRC configuration/reconfiguration complete message.

The duration of the first timer before expiry may be either a predetermined value or a value received via RRC configuration.

FIGS. 1 to 6 show various illustrative examples to aid understanding the present disclosure. The illustrative examples will be described in case where the downlink channel is a PDSCH and the uplink channel is a PUSCH. For simplicity, the notation PDSCH1 is used to denote the first downlink data transmission on PDSCH, PDSCH2 is used to denote the second downlink data transmission on PDSCH, and so on. Similarly, FB-DCI1 is used to denote a first fallback downlink control information element, etc.

FIGS. 1A and 1B show illustrative examples of the UE determining whether group-based acknowledgement feedback is active. FIG. 1A illustrates the situation where, after transmitting an RRC complete message 10 on PUSCH, the UE receives a second DCI (NFB) prior to receiving the first DCI (not shown). The second DCI is a non-fallback DCI. The presence of the NFB-DCI confirms the effectiveness of the RRC configuration and of activation of the group-based acknowledgement feedback since NBF-DCI contains information fields specific to group-based acknowledgement feedback.

FIG. 1B illustrates the situation where, after transmitting an RRC complete message 10 on PUSCH, the UE starts a timer. Upon expiry of the timer, the UE determines that group-based acknowledgement feedback is active. In FIG. 1B the timer is shown as starting at a first reference time corresponding to the UE completing transmission of the RRC complete message 10, however in other embodiment the first reference time may be other values as described above.

As described above, FIGS. 1A and 1B can be combined so that the UE determines group-based acknowledgement feedback is active when whichever of FIG. 1A or 1B occurs first.

In the remaining illustrative examples, shown in FIGS. 2-5, it is assumed that the UE has determined group-based acknowledgement feedback is active. Moreover, we assume that the first DCI shown in the drawing is the first DCI received by the UE after group-based acknowledgement feedback is determined to be active.

Referring now to FIG. 2, an example is shown in which a UE firstly receives a NFB-DCI scheduling PDSCH1. The NFB-DCI indicates that PDSCH1 is in HARQ process ID=0 and it belongs to group 0 (G0 hereafter). Moreover the NFB-DCI indicates the UE to report the AN of all PDSCHs in G0 in the K1=3 slots from the slot where UE receives the NFB-DCI. At this moment, there is only PDSCH1 in G0. The NFI of G0 has value of 0.

Then in the next slot, the UE receives a FB-DCI1 in which there is no explicit indication for NFI and Group ID. FB-DCI1 schedules PDSCH2.

FB-DCI1 constitutes a first downlink control information element described above. UE will allocate PDSCH2 scheduled by FB-DCI1 to a default group ID. Here we assume that the default group ID=0. Thus, the G0 now contains PDSCH1 and PDSCH2.

Then, the UE will evaluate a first condition to determine an updated new feedback indicator value. In this example, the first condition comprises: HARQ ID in FB-DCI1 is equal to any of the HARQ ID of the existing PDSCH, prior to the reception of the received FB DCI, in the default group (G0); and C-DAI=0 in FB-DCI1; and NDI in FB-DCI is toggled with respect to NDI in the default group.

If all the above three conditions are verified, UE deems the first condition is satisfied. In the FB-DCI1, it indicates that the HARQ ID=1, which is not equal to any of the HARQ ID of the existing PDSCH in the default group prior to the reception of the FB DCI. Thus, this condition is not verified, and the UE will determine that the NFI value of G0 is not changed, which is NFI=0. Thus, the UE will report the acknowledgement feedback (AN) of PDSCH1 and PDSCH2 in the allocated PUCCH slot indicated by K1.

After transmitting AN on the PUCCH, the UE receives FB-DCI2, scheduling PDSCH3. Similarly, the UE will determine that PDSCH3 belongs to the default group, i.e. G0. Moreover, according to the indication about HARQ ID and C-DAI, the UE determines that the condition is not verified since the HARQ ID in FB-DCI2 is not equal to any HARQ ID in G0. As a result, the UE determines that the NFI value of G0 is not changed, i.e. the previously reported AN of G0 is not correctly received by the BS. Therefore, the UE will report the AN of PDSCH1, PDSCH2 and PDSCH3 in the allocated PUCCH indicated by K1 in FB-DCI2.

Figure 3:
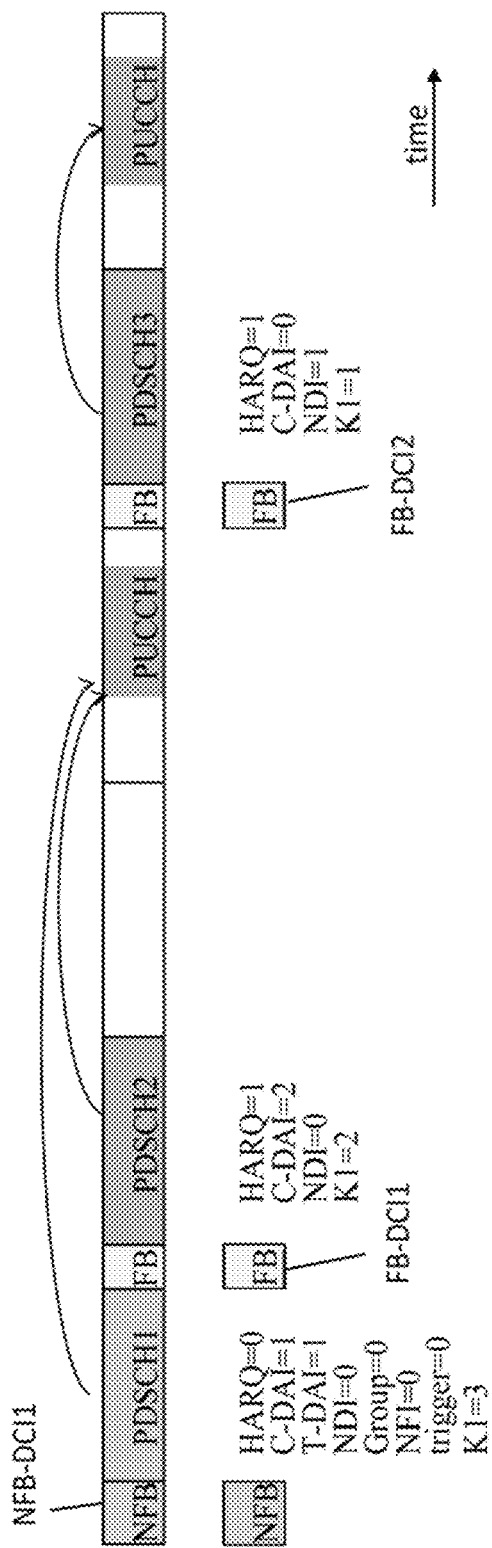

Referring now to FIG. 3, an example is shown which is similar to that shown in FIG. 2. However, in FIG. 3, the FB-DCI2 scheduling PDSCH3 received by the UE has different information content to that in FIG. 2. Using the same first condition evaluation as described above in FIG. 2, in the example of FIG. 3, the UE determines the first condition is satisfied and accordingly the UE determines an updated NFI value by toggling the existing NFI of G0. Toggling the NFI value indicates that prior to the reception of the FB-DCI2, the BS correctly received previous AN feedback of G0. Thus, the previously reported AN won't be reported again by the UE. Thus, the UE only reports AN of PDSCH3 in the PUCCH slot indicated by K1 in FB-DCI2.

Figure 4:
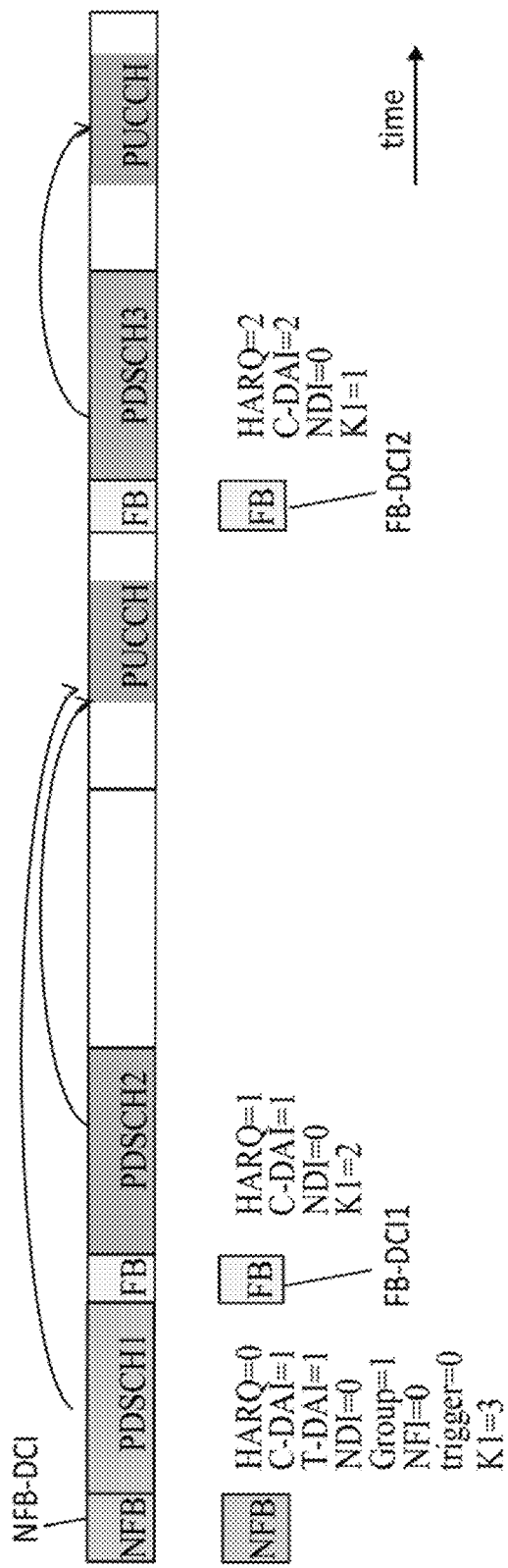

Referring now to FIG. 4. In this example, the UE receives a FB-DCI1 scheduling PDSCH2. But prior to receiving FB-DCI1, the UE receives NFB-DCI1 scheduling PDSCH1, which is in group 1 (G1 hereafter). Thus, the FB-DCI1 scheduling PDSCH2 is the first DCI in group 0. Therefore, the UE will determine a default NFI value (say NFI=0). This value is a binary value, which can be RRC configured or fixed in the UE. As the NFB-DCI1 points the AN feedback to the same slot as the FB-DCI1 does, the UE will report both AN feedback of the PDSCHs from G0 and from G1 in the PUCCH. In this example G0 contains PDSCH2 and G1 contains PDSCH1.

When the UE later receives FB-DCI2 scheduling PDSCH3, the UE evaluates the first condition using the values received in the FB-DCI2. In this example, the first condition turns out to be not satisfied. Thus, the UE determines that the NFI value is not changed (NFI still equals to 0) for G0. Thus in the PUCCH, UE will report the AN feedback of PDSCH2 and PDSCH3 in G0.

Figure 5:
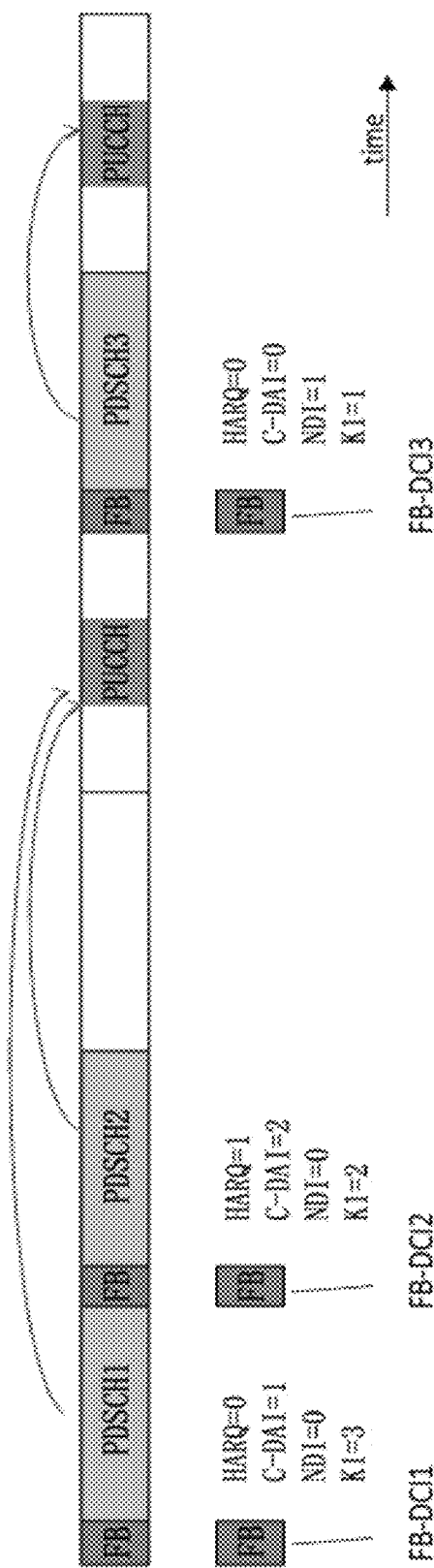

Referring now to FIG. 5. In this example, the UE firstly receives FB-DCI1. That is, the UE has not received a NFB-DCI. In this case, the FB-DCI1 scheduling PDSCH1 is the first DCI in the default group, say G0. Therefore, the UE will determine a default NFI value (say NFI=0).

The UE then receives FB-DCI2 scheduling PDSCH2. Again, the UE will allocate PDSCH2 to the default group, G0. In this example G0 now contains PDSCH1 and PDSCH2. The UE then evaluates the first condition using the values received in the FB-DCI2. In this example, the first condition turns out to be not satisfied. Thus, the UE determines that the NFI value for G0 is not changed (NFI still equals to 0). Thus in the PUCCH, UE will report the AN feedback of PDSCH1 and PDSCH2 in G0.

When the UE later receives FB-DCI3 scheduling PDSCH3, the UE evaluates the first condition using the values received in the FB-DCI3. In this example, the first condition turns out to be satisfied. Thus, the UE determines that the NFI value is toggled (NFI equals to 1) for G0. Thus in the PUCCH, UE will report the AN feedback of PDSCH3 only in G0.

Figure 6:
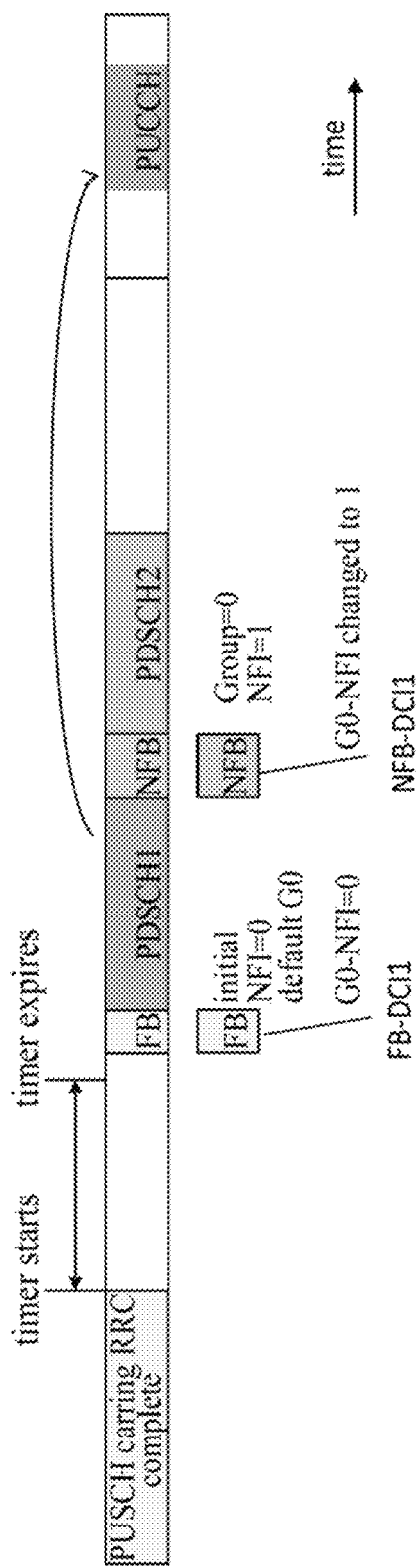

Referring now to FIG. 6. In this example, the UE firstly receives FB-DCI1 after expiry of the first timer. In this case, the UE determines that group-based acknowledgement feedback is active since the first timer has expired. The UE then allocated FB-DCI1 scheduling PDSCH1 to a default group, say G0. Since the UE has not received a NFB-DCI, FB-DCI1 scheduling PDSCH1 is the first DCI in the default group, say G0. Therefore, the UE will determine a default NFI value (say NFI).

The UE then receives NFB-DCI1 scheduling PDSCH2 prior to transmitting acknowledgement feedback on PUCCH. In this example, the UE determines that the group ID of NFB-DCI1 is the same as the default group G0 that FB-DCI1 was assigned to. Since the UE has not transmitted acknowledgement feedback yet, the UE determines that the NFI value for G0 is replaced with the NFI value in NFB-DCI1.

Embodiments of the present disclosure also relate to a user equipment comprising a module for acknowledgment on an uplink channel, from the user equipment to a base station, for downlink data received on a downlink channel of an unlicensed band in a radio access network, configured to control the execution of the above method.

Embodiments of the present disclosure also relate to a computer-readable medium comprising program instructions for causing a user equipment to perform the above method. The computer-readable medium may be a non-transitory medium.

In the above description, the mobile telecommunication system is a 5G mobile network comprising a 5G NR-U (New Radio in unlicensed spectrum) access network. The present disclosure can be applied to other mobile networks, in particular to mobile network of any further generation cellular network technology (6G, etc.).

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

A further embodiment is a computer program product comprising a computer readable storage medium having computer readable program code embodied therein, the computer readable program code being configured to implement one of the above methods when being loaded on a computer, a processor, or a programmable hardware component. In some embodiments, the computer readable storage medium is non-transitory.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F) PLAs) or (field) programmable gate arrays ((F)PGAs), programmed to perform said steps of the above-described methods It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

List of abbreviations in the description and drawings:

| Acronym | Full name |
| --- | --- |
| NR | New Radio |
| NR-U | New Radio-Unlicensed |
| BS | Base Station |
| UE | User Equipment |
| PDSCH | Physical Downlink Shared CHannel |
| DCI | Downlink Control Information |
| FB-DCI | Fallback Downlink Control Information |
| NFB-DCI | Non-fallback Downlink Control Information |
| LBT | Listen Before Talk |
| AN | Ack/Nack |
| PUCCH | Physical Uplink Control CHannel |
| PUSCH | Physical Uplink Shared CHannel |
| C-DAI | Counter Downlink Assignment Indicator |
| T-DAI | Total Downlink Assignment Indicator |
| NFI | Need Feedback Indicator |

What is claimed is:

1. A method of acknowledgement on an uplink channel, from a user equipment to a base station, for downlink data received on a downlink channel of an unlicensed band in a radio access network, comprising:
    receiving, by the user equipment, a first downlink control information element (FB-DCI1) that does not contain explicit indication about a group identifier and/or does not contain explicit indication about a new feedback indicator;
    determining, by the user equipment, whether a group-based acknowledgement feedback is active,
    wherein if the group-based acknowledgement feedback is determined to be active, allocating, by the user equipment, the first downlink control information element to a first group (G0);
    determining, by the user equipment, a slot in which the user equipment shall report the group-based acknowledgement feedback of the first group based on an information field (K1) of the first downlink control information element;
    determining, by the user equipment, an accumulated number of transmissions in the first group based on a value of a second information field (C-DAI) in the first downlink control information element;
    determining, by the user equipment, an updated new feedback indicator for the first group based on an existing new feedback indicator (NFI) for the first group and a first condition,
    wherein:
    if the first condition is determined to be satisfied, the updated new feedback indicator for the first group is determined by toggling the existing new feedback indicator;
    if the first condition is determined to be not satisfied, the updated new feedback indicator for the first group is determined to be the existing new feedback indicator; and
    transmitting on an uplink channel (PUCCH), by the user equipment, the group-based acknowledgement feedback of the first group to the base station based on the updated new feedback indicator.

2. The method of claim 1, wherein the first condition comprises whether a HARQ process ID (HARQ) indicated in the said first downlink control information element is equal to a first HARQ process ID value.

3. The method of claim 2, wherein the first condition further comprises whether the indicated C-DAI has a first DAI value.

4. The method of claim 2, wherein the first condition further comprises whether the indicated NDI is toggled with respect to an NDI value of the said first HARQ process ID.

5. The method of claim 2, wherein the first HARQ process ID value is either: one of the HARQ process ID in the said first group before the user equipment receives the said first downlink control information element; or
    one of the HARQ process ID, scheduled by the same DCI format as the said first downlink control information element, in the said first group before the user equipment receives the said first downlink control information element.

6. The method of claim 1, wherein if the said first downlink control information element is a first DCI reception in the said first group after a group-based function becomes active, the user equipment determines an initial NF value according to either a predetermined value or a default value received via RRC configuration.

7. The method of claim 1, wherein the second information field comprises a C-DAI field in the first downlink control information element.

8. The method of claim 1, wherein determining, by the user equipment,
whether the group-based acknowledgement feedback is active comprises evaluating, by the user equipment, a second condition,
wherein if said second condition is satisfied, the user equipment determines that the group-based acknowledgement function is active.

9. The method of claim 8, wherein the second condition comprises at least one of:
reception of a second downlink control information element after a reference time: and/or
a first timer expires prior to the reception of the said first downlink control information element.

10. The method of claim 9, wherein second condition comprises whichever of the said first timer expiry and reception of the second downlink control information element after the reference time occurs first.

11. The method of claim 9, wherein the reference time comprises either the time when the user equipment finishes transmitting a RRC configuration/reconfiguration complete message, or
the time when the user equipment receives an uplink grant to transmit said RRC configuration/reconfiguration complete message.

12. The method of claim 8, wherein the user equipment is configured to start said first timer after transmitting the RRC configuration/reconfiguration complete message.

13. The method of claim 8, wherein the expiration duration of the timer is either a predetermined value or a default value received via RRC configuration.

14. A user equipment, comprising:
a processor configured to control an input interface to receive a first downlink control information element (FB-DCI1) that does not contain explicit indication about a group identifier and/or does not contain explicit indication about a new feedback indicator;
determine, whether a group-based acknowledgement feedback is active,
wherein if the group-based acknowledgement feedback is determined to be active: allocate the first downlink control information element to a first group (G0);
determine a slot in which the user equipment shall report the group-based acknowledgement feedback of the first group based on an information field (K1) of the first downlink control information element;
determine an accumulated number of transmissions in the first group based on a value of a second information field (C-DAI) in the first downlink control information element:
determine an updated new feedback indicator for the first group based on an existing new feedback indicator (NFI) for the first group and a first condition,
wherein:
if the first condition is determined to be satisfied, the updated new feedback indicator for the first group is determined by toggling the existing new feedback indicator;
if the first condition is determined to be not satisfied, the updated new feedback indicator for the first group is determined to be the existing new feedback indicator, and
control an output interface to transmit on an uplink channel (PUCCH), by the user equipment, the group-based acknowledgement feedback of the first group to the base station based on the updated new feedback indicator.

15. A non-transitory computer readable medium comprising program instructions for causing a user equipment to perform the following steps:
receiving, by the user equipment, a first downlink control information element (FB-DCI1) that does not contain explicit indication about a group identifier and/or does not contain explicit indication about a new feedback indicator;
determining, by the user equipment, whether a group-based acknowledgement feedback is active,
wherein if the group-based acknowledgement feedback is determined to be active: allocating, by the user equipment, the first downlink control information element to a first group (G0);
determining, by the user equipment, a slot in which the user equipment shall report the group-based acknowledgement feedback of the first group based on an information field (K1) of the first downlink control information element;
determining, by the user equipment, an accumulated number of transmissions in the first group based on a value of a second information field (C-DAI) in the first downlink control information element;
determining, by the user equipment, an updated new feedback indicator for the first group based on an existing new feedback indicator (NFI) for the first group and a first condition,
wherein:
if the first condition is determined to be satisfied, the updated new feedback indicator for the first group is determined by toggling the existing new feedback indicator
if the first condition is determined to be not satisfied, the updated new feedback indicator for the first group is determined to be the existing new feedback indicator; and
transmitting on an uplink channel (PUCCH), by the user equipment, the group-based acknowledgement feedback of the first group to the base station based on the updated new feedback indicator.

* * * * *